Figure 1:
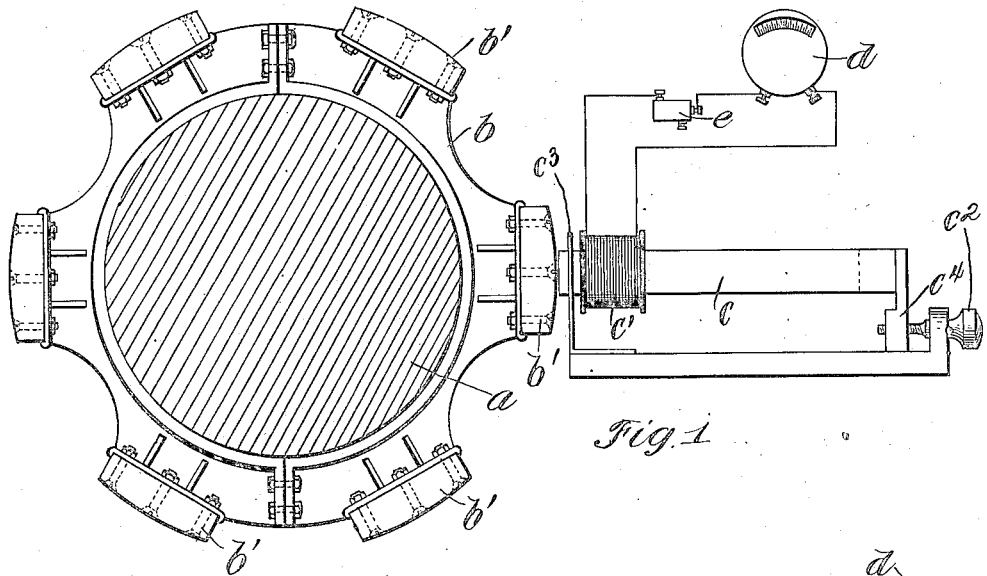

(No Model.) 2 Sheets—Sheet 1.

B. A. FISKE.
SPEED AND DIRECTION INDICATOR.

No. 591,162. Patented Oct. 5, 1897.

Witnesses
De Witt C. Tanner
W. Clyde Jones.

Inventor:
Bradley A. Fiske
By Barton & Brown
Attorneys.

(No Model.) 2 Sheets—Sheet 2.

B. A. FISKE.
SPEED AND DIRECTION INDICATOR.

No. 591,162. Patented Oct. 5, 1897.

Witnesses:
DeWitt C. Tanner
W Clyde Jones.

Inventor:
Bradley A. Fiske,
By Barton & Brown
Attorneys.

UNITED STATES PATENT OFFICE.

BRADLEY ALLAN FISKE, OF THE UNITED STATES NAVY, ASSIGNOR TO THE WESTERN ELECTRIC COMPANY, OF CHICAGO, ILLINOIS.

SPEED AND DIRECTION INDICATOR.

SPECIFICATION forming part of Letters Patent No. 591,162, dated October 5, 1897.

Application filed February 24, 1896. Serial No. 580,332. (No model.)

*To all whom it may concern:*

Be it known that I, BRADLEY ALLAN FISKE, of the United States Navy, a citizen of the United States, residing at New York, in the county of New York and State of New York, have invented a certain new and useful Improvement in Electrically-Operated Speed and Direction Indicators, (Case No. 1,) of which the following is a full, clear, concise, and exact description, reference being had to the accompanying drawings, forming a part of this specification.

My invention relates to apparatus for indicating at a distance the direction and speed of rotation of an engine-shaft or other moving part.

My invention is particularly adapted to steamships, where it is desirable that the officer upon the bridge may know the direction and speed of revolution of the propeller-shaft in order that he may determine the speed with which the ship is traveling and whether the ship is moving forward or backward.

The object of my invention is to provide apparatus that will give accurate indications and that will not readily get out of order or out of adjustment by continued use.

A speed-indicator has heretofore been constructed in the form of an electromagnetic device adapted to be actuated once upon each revolution of the shaft, so that by counting the number of indications for, say, a minute the rate of speed of revolution of the shaft may be determined. Automatic mechanism has also been provided in connection with this form of indicator and connected with a clock, so that, without counting, the operator can, by setting the apparatus in motion, find out at the end of an interval of time how many revolutions the shaft has made. One needle has sometimes been employed for indicating the revolutions of the shaft in one direction, while a second needle is adapted to indicate the revolutions in the opposite direction. These devices are actuated through the agency of an electric current whose circuit is opened and closed during each revolution of the shaft. The apparatus has always been more or less complicated, and, due to the various contacts, it cannot operate accurately for long periods, particularly in sea air, which has a deleterious effect upon the contacts.

A second class of indicators has been employed in which a small direct-current dynamo has been belted or geared to the shaft so that its armature is rotated by the shaft, the speed of the armature varying with the speed of the shaft and moving in one direction or the other in accordance with the movement of the shaft. The armature is connected in circuit with a direct-current galvanometer, so that the needle shows the direction of rotation and, approximately, the speed. In this class of indicators considerable trouble has been experienced, as the resistance between the brushes and the commutator has varied, unless constant care was exercised, and in apparatus intended for this class of work this continual care has been impracticable.

It has also been proposed to operate an electrical speed-indicating device connected in a permanently-closed circuit with the generator of alternating currents, as exemplified in United States Letters Patent to Henry, No. 508,614, of November 14, 1893, but I am not aware that this class of apparatus has ever been placed in practical use.

The device of the present application consists in certain improvements upon the apparatus above referred to, hereinafter pointed out in the specification.

The speed-indicator of my invention consists of an alternating-current generator operated by the rotation of the shaft to produce an alternating current which is caused to traverse an indicator which is graduated to indicate the speed at which the shaft is rotating when a definite current traverses the indicator.

The generating apparatus I prefer to employ comprises a number of magnetic masses or blocks of soft iron mounted upon the shaft and rotating opposite the poles of a magnet, (either a permanent magnet or an electromagnet,) coils being provided upon the magnet and connected in circuit with the indicator located at the distant point of observation. As the shaft rotates and the blocks of magnetic material are moved opposite the poles of the magnet an alternating current is induced in the coils, the frequency, and, consequently, the average electromotive force of which will be proportional to the speed of rotation of the shaft. The indicator responds to the average current and points are marked upon the scale of the indicator corresponding to the position of the needle under definite speeds of rotation of the shaft.

Where, as on shipboard, the indicator is subjected to a swinging motion, I mount the indicator upon gimbals in a manner similar to that in which a compass is usually mounted, and to prevent the fluctuation of the needle due to the vibration and the rolling and pitching of the ship and also to sudden changes in speed the indicator casing is filled with liquid. In order to permit the expansion and contraction of the liquid within the casing, I provide one or more stand-pipes extending outside of the casing in which the liquid may rise as it expands and from which, upon contraction, the liquid may pass into the casing.

The direction-indicator comprises an inductive device operated by the rotation of the shaft which generates a current or currents which cause movements of a direct-current indicator predominating in one direction or the other, according to the direction of rotation of the shaft.

The inductive device as employed in practice takes the form of a magnet carried upon the shaft, the poles of which, as the shaft rotates, pass in front of the end of a soft-iron core upon which is mounted a coil connected with the distant indicator. As the shaft revolves, say, in a clockwise direction, and one pole of the magnet, say the south pole, approaches the end of the soft-iron core, a current is induced in the coil in one direction which causes the needle of the indicator to move, say, to the right. As the south pole leaves the end of the core and the north pole approaches the needle moves back to its normal position and then to the left, while the recession of the north pole from the end of the core moves the needle to the right again. The needle moves, therefore, to the right, left, right. If, on the other hand, the shaft is revolving in the opposite direction, the first pole to be presented to the iron core will be the north pole, and then the south, and the south will be the last to leave it, so that the resulting currents will cause the needle of the indicator to move to the left, right, left, and in just the reverse succession of the movements in the other case. An operator watching the indicator can therefore tell the direction in which the shaft is moving, because, no matter whether the indicator is marked for the first or the second movement of the needle, the operator has merely to note the movement for which the indicator is marked.

I find it desirable to have audible as well as visible signals given upon each revolution of the shaft, and to this end an electric bell may be connected in circuit with the direction-indicator either in series or in parallel, preferably in parallel. The bell responds to all currents and strikes every time the magnet passes the iron core, so that the ear is thus enabled to aid the eye in noting the instant of each revolution.

I find in practice that for speeds of a shaft between thirty and one hundred and twenty revolutions per minute, which include the ordinary speeds of steamship-shafts, the second movement is the most pronounced, and that the third movement is practically *nil*, and also that the bell strikes as the needle makes the second movement. If at these speeds the needle moves to the right, left, right, the observer sees the needle move a little to the right and then give a quick long movement to the left, which ceases abruptly, as though the needle struck a fixed object. The bell strikes at this instant and the needle returns at once to the middle position, going beyond it to the right by so small an amount as to be inappreciable. With a very little practice an observer has no difficulty whatever in judging the direction of rotation of the shaft.

I will describe my invention more in particular by reference to the accompanying drawings, in which—

Figure 2:
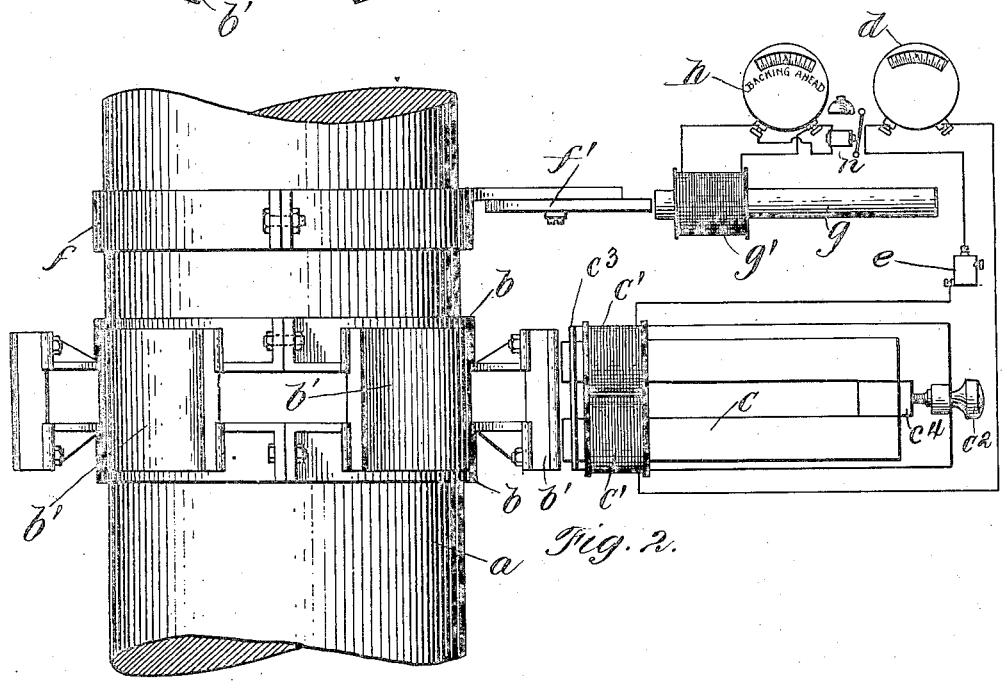
Figure 3:
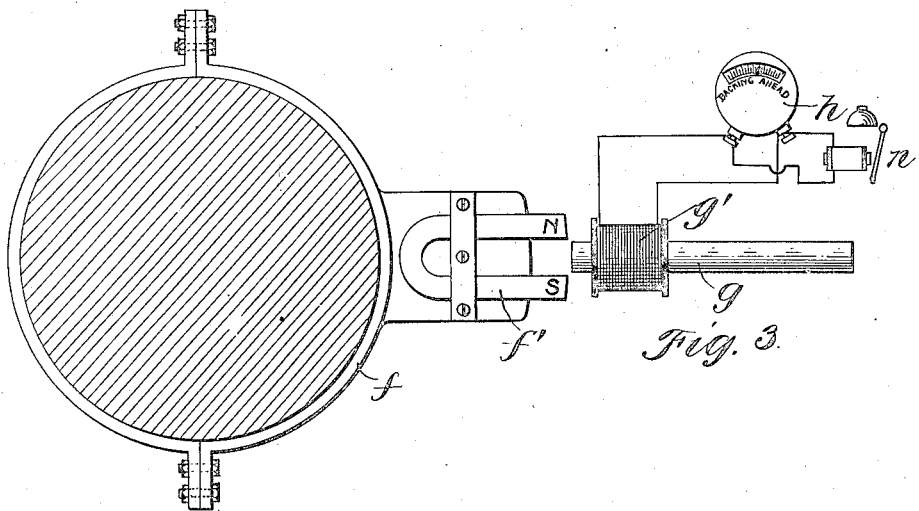
Figure 4:
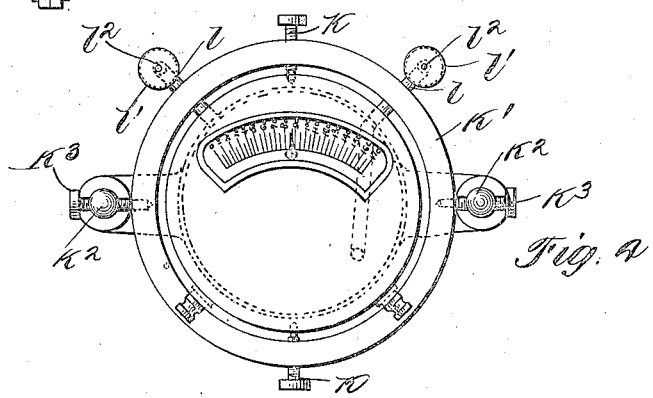
Figure 5:
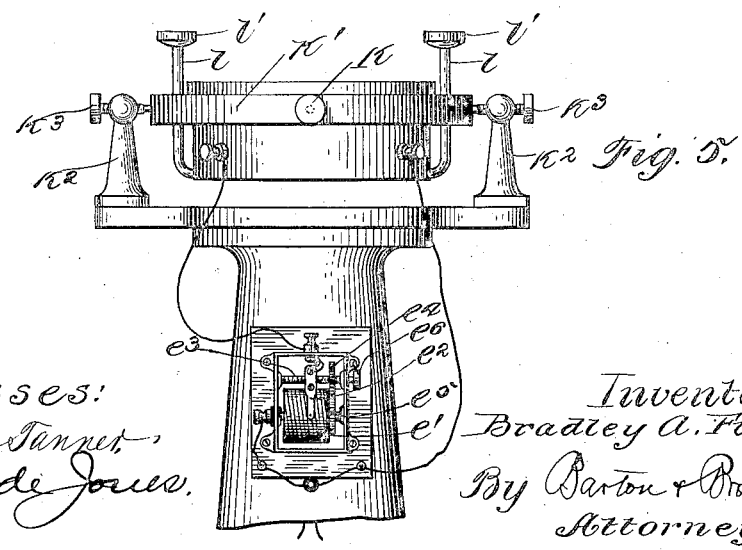

Figure 1 is a view in elevation of the speed-indicator, the shaft being shown in section and the circuit connections in diagram. Fig. 2 is a plan view of the speed-indicator and of the direction-indicator. Fig. 3 is a view in elevation of the direction-indicator, the shaft being shown in section. Fig. 4 is a plan view of the indicator, showing the manner in which it is mounted upon the gimbals. Fig. 5 is a view thereof in elevation.

Like letters refer to like parts in the several figures.

Upon the shaft $a$ are mounted collars or rings $b$ $b$, formed in sections which are united by bolts, the said bolts serving to clamp securely upon the shaft the sectional collars, upon which are mounted masses of magnetic material, usually in the form of soft-iron blocks $b'$ $b'$. The blocks, as illustrated in the drawings, are six in number and are adapted as the shaft rotates to pass in front of the poles of the permanent magnet $c$, upon which are mounted the coils $c'$ $c'$, connected in electrical circuit with the indicator $d$, which is situated at the distant point of observation. As the blocks successively pass in front of the poles of the magnet an alternating current is induced in the coils $c'$ $c'$, which traverses the indicator $d$, the needle or index-finger of which indicates the speed of rotation. As the speed of the shaft increases the blocks of magnetic material pass more rapidly across the poles of the electromagnet and the frequency of the alternating current is thus increased and the needle of the indicator $d$ is moved accordingly. The graduation of the indicator-scale is empirical, the position of the needle at different speeds being marked in the construction of the apparatus.

I have found it desirable to introduce two adjustments to the apparatus as thus constructed, one for adjusting the length of the air-gap and the other for varying the electrical resistance of the circuit. To accomplish the former, the magnet $c$ is mounted upon a sliding block $c^4$, through which an adjusting-screw $c^2$ passes, whereby the position of the magnet may be varied by turning the screw $c^2$. A plate $c^3$ is provided at the forward end of the electromagnet for supporting the same, the magnet being capable of longitudinal movement through the support when the position of the magnet is adjusted. The position of the magnet may be adjusted to vary the air-gap and thus to adjust the strength of the current traversing the circuit. For smaller adjustments a rheostat $e$ is introduced into the circuit, the rheostat preferably comprising, as illustrated in Fig. 5, a cylinder $e'$, upon which the resistance-wire is wound, a contact-arm $e^2$ being provided, which engages the wire. The contact-arm $e^2$ carries a nut engaging the threaded shaft $e^3$, which is geared to the cylinder $e'$ by means of gear-wheels $e^4$ $e^5$. Upon turning the threaded shaft $e^3$ by means of the handle $e^6$ the drum is rotated and the contact-arm is moved longitudinally along the drum to include a greater or less length of the wire in circuit, and thus varying the resistance. By thus forming in sections the collars $b$ $b$, carrying the inductors, the indicating apparatus shown is readily installed in vessels without the necessity of disturbing the engines or shafting in any way.

Another advantage attained by the apparatus above described is that the permanent magnet $c$ is stationarily mounted, whereby its field is far less liable to suffer change than if said magnet constituted the rotating part of the apparatus. In consequence the speed-indicator of my invention is rendered more accurate in its continued operation than apparatus wherein the arrangement last named is employed.

The direction-indicator is illustrated in Figs. 2 and 3 and comprises a collar or ring $f$, upon which is mounted a permanent magnet $f'$, the poles S and N of which are adapted to successively pass the end of a soft-iron core $g$ as the shaft rotates. Upon the core $g$ is provided a coil $g'$, connected with the direction-indicator $h$. Supposing the shaft to be rotated in clockwise direction, a current is induced in the coil $g'$ as the south pole of the magnet approaches the end of the core, thus causing the needle of the indicator to move, say, to the right. As the south pole recedes from the end of the core and the north pole approaches a current of the opposite direction is induced in the coil $g'$, and as the north pole recedes from the end of the core a current is induced which tends to move the needle toward the right again. If the shaft be rotating in the opposite direction—that is, contra-clockwise—the currents induced in the coil $g'$ will swing the needle in the opposite directions each time the shaft rotates. By observing the direction in which the needle swings the direction of rotation of the shaft may be determined. The direction-indicator also serves as a test for the accuracy of the speed-indicator, as the number of revolutions of the shaft per unit of time may be determined by counting the number of swings of the needle of the direction-indicator. The direction-indicator is therefore a speed-indicator also.

As illustrated in Figs. 4 and 5, the casing of the indicator is pivoted by means of screws $k$ $k$ to a ring $k'$, which, in turn, is pivoted to the standards $k^2$ $k^2$ by means of screws $k^3$ $k^3$. The casing is thus free to maintain its horizontal position regardless of the pitching of the ship.

I have found it advisable to fill the casing with liquid, and to provide for the expansion and contraction of the liquid one or more expansion-pipes $l$ $l$ are provided, connecting with the interior of the casing and preferably extending above the top of the casing, the pipes having enlargements $l'$ $l'$ at the top, through which openings $l^2$ $l^2$ may be provided, though the openings may be omitted, provided a certain air-space is left in the pipes. As the liquid within the casing expands from the heat of the sun or otherwise the excess liquid rises in the pipe, and when the liquid contracts a portion of the liquid flows back into the casing.

The indicator within the casing is connected by means of flexible conductors extending from binding-posts provided upon the casing to binding-posts provided upon the standards supporting the gimbals.

The rheostat is mounted within or upon the standard in an accessible position, and the resistance of the circuit may be adjusted without interfering with the freedom of movement of the indicating device, which is permitted by the flexible conductors.

In the drawings the coils $c'$ and $g'$ are represented as stationary, while the inductors $b'$ and the magnet $f'$ are moved by the shaft. As the induction of the currents, however, results from relative motion between the coils on the one hand and the inductors $b'$ and the magnet $f'$, it is evident that the magnet $f'$ may be made stationary and the coils (with the magnet $c$ and iron core $g$) moved by the shaft, the coils being connected to their respective indicators through sliding contacts, according to methods well known in the electrical art, without departing from the spirit of my invention. Furthermore, the moving parts, instead of being mounted directly on the shaft whose speed is to be measured, may be moved by said shaft in any well-known manner—as, for instance, by belting or gearing.

Having described my invention, what I claim as new, and desire to secure by Letters Patent, is—

1. The combination in an electrically-controlled direction-indicator, with a direct-current responsive device or indicator, of a helix connected permanently in electrical circuit therewith, a soft-iron core whereon said helix is mounted, and a magnetic device having a plurality of dissimilar pole-pieces mounted upon and adapted to be actuated by the movement of the indicated part to present said dissimilar pole-pieces to the core in different predetermined orders corresponding to the direction of movement of said part, whereby actuating-currents are generated in the indicator-circuit, substantially as described.

2. The combination with an indicator situated in a casing mounted in gimbals, of a rheostat mounted upon the standard supporting said gimbals, and flexible conductors connecting the rheostat and the indicator, whereby the rheostat may be adjusted without interfering with the freedom of movement of the indicator, substantially as described.

3. In an electrically-operated direction-indicator, the combination with a direct-current responsive device or indicator, of a generating-helix and an audible electric signaling device connected permanently in an electrical circuit, a soft-iron core on which said helix is mounted, and a magnetic device provided with a plurality of dissimilar pole-pieces mounted to be actuated by the part the direction of movement of which is to be indicated, said magnetic device being adapted to be presented to said core and generate alternating currents in the helix corresponding to the movement of the indicated part, whereby movement is imparted to the needle of the indicator in one direction or the other corresponding to the direction of movement of the indicated part and the audible signaling device is actuated, substantially as described.

4. In a combined speed and direction indicator, the combination with a soft-iron core, $g$, of coils $g'$ mounted thereon, a responsive device or indicator $h$ connected permanently in electrical circuit therewith, and a bipolar magnet $f'$ carried upon the moving part, the poles of said magnet being adapted to be moved successively past the end of the soft-iron core at each completed movement of the said part, the order of presentation depending upon the direction of movement, whereby the needle of the indicator is actuated to give a positive corresponding signal at each successive movement of the part, substantially as described.

5. In a combined speed and direction indicator, the combination with a soft-iron core $g$, of coils $g'$ mounted thereon, a responsive device or indicator $h$ connected permanently in electrical circuit therewith, an audible signaling device also connected permanently with the coils, and a bipolar magnet $f'$ carried upon the moving part, the poles of said magnet being adapted to be moved successively past the end of the soft-iron core at each completed movement of the said part, the order of presentation depending upon the direction of movement, whereby the needle of the indicator is actuated to give a positive corresponding signal at each successive movement of the part and the audible signal is simultaneously sounded, substantially as described.

6. In a combined speed and direction indicator, the combination with a responsive device or indicator, of coils permanently connected in electrical circuit therewith, an inductor actuated by the moving part the speed and direction of movement of which are to be measured and adapted to induce alternating currents in said coils, a second responsive device or indicator, coils permanently connected in electrical circuit therewith, and an inductor carried upon the moving part and adapted to produce in said coils currents which impart movement to the needle of said indicator, the frequency of which is in direct ratio to the rate of speed of the said moving part, the said movement of the needle being in one direction or the other according to the direction of movement of the moving part, substantially as described.

7. In a combined speed and direction indicator, the combination with a helix of a magnetic device provided with a plurality of dissimilar pole-pieces adapted to generate alternating currents in said helix, one of the above-named elements being mounted to be actuated by the indicated part whereby the dissimilar pole-pieces are presented to the helix in different predetermined orders corresponding to the direction and rate of movement of said indicated part, and corresponding currents are generated in the helix and a direct-current-indicating device connected in continuously-closed circuit with said helix adapted to be actuated by said currents and indicate the direction and speed of the indicated part, substantially as described.

8. In a speed-indicator, the combination with a magnet $c$ stationarily mounted, of coils $c'$ carried upon said magnet, an indicating device $d$ permanently connected in electrical circuit with said coils, and adapted to be actuated by the current generated therein, sectional collars $b$ $b$ adapted to be secured to the speed-measured part and inductors $b'$ $b'$ carried thereon, and adapted to be moved past the poles of the magnet whereby current is generated in the coils and the indicating device is actuated, substantially as described.

9. The combination in a speed-indicator, with a permanent magnet $c$ stationarily mounted, of helices $c'$ carried upon the poles of said magnet, a current-indicating device $d$ connected permanently in electrical circuit with said helices, a rheostat $e$ included in the said circuit, sectional collars $b\ b$ adapted to be secured upon the rotating shaft $a$, inductors $b'\ b'$ mounted upon said collars adapted to be rotated by said shaft past the poles of magnets $c$ whereby actuating currents are generated in the helices, and means for securing the lateral adjustment of the magnet, substantially as described.

In witness whereof I hereunto subscribe my name this 20th day of November, A. D. 1895.

BRADLEY ALLAN FISKE.

Witnesses:
W. F. BARNITZ,
E. M. ROCKAFELLOW.